United States Patent [19]

Tsuge

[11] 4,449,721
[45] May 22, 1984

[54] SPLIT PISTON RING HAVING STEPPED ENDS

[75] Inventor: Kazuo Tsuge, Yokohama, Japan

[73] Assignee: Tokico Ltd., Kawasaki, Japan

[21] Appl. No.: 331,129

[22] Filed: Dec. 15, 1981

[30] Foreign Application Priority Data

Dec. 18, 1980 [JP] Japan .................. 55-182563[U]

[51] Int. Cl.³ ............................................... F16J 9/00
[52] U.S. Cl. ...................................... 277/221; 277/222
[58] Field of Search ................ 277/199, 216, 218–222, 277/217, 198

[56] References Cited

U.S. PATENT DOCUMENTS

| | | | |
|---|---|---|---|
| 1,206,691 | 11/1916 | Frykman | 277/220 |
| 1,355,237 | 10/1920 | Maloney | 277/222 |
| 1,363,239 | 12/1920 | Ekman | 277/222 |
| 1,381,668 | 6/1921 | Schaap | 277/222 |
| 1,384,158 | 7/1921 | Setter | 277/222 |
| 3,373,999 | 3/1968 | Jepsen | 277/222 X |
| 3,455,565 | 7/1969 | Jepsen | 277/222 X |
| 3,655,208 | 4/1972 | Walker | 277/221 |

FOREIGN PATENT DOCUMENTS

| | | | |
|---|---|---|---|
| 738643 | 10/1932 | France | 277/220 |
| 54-42083 | 12/1979 | Japan . | |
| 55-27524 | 2/1980 | Japan . | |

*Primary Examiner*—Robert S. Ward
*Attorney, Agent, or Firm*—Wenderoth, Lind & Ponack

[57] ABSTRACT

A piston ring working in a cylinder and receiving a higher pressure on one axial side thereof than one the other and having axially overlapping stepped ends, wherein a circumferentially extending resilient lip is provided on one of the stepped ends of the low pressure side, and a circumferentially extending projection is provided on the other of the stepped ends of on the low pressure side and is located radially outwards of the lip to radially overlap therewith at least partially. In use, the lip resiliently deforms to engage with the projection in response to pressure acting on the radially inner surface of the piston ring.

2 Claims, 11 Drawing Figures

SPLIT PISTON RING HAVING STEPPED ENDS

BACKGROUND OF THE INVENTION

This invention relates to a piston ring and, particularly, to a piston ring having improved sealing characteristics with respect to a gap thereof.

Conventionally, a piston ring fitted in an annular groove in a piston and working in a cylinder has a gap between the circumferentially opposite ends of the piston ring to permit the thermal expansion of the piston ring and to permit the wear of the cylinder and the piston ring. When a pressure difference acts between the axially opposite surfaces of the piston ring, gas leaks therebetween through the radial clearance between the inner wall of the cylinder and the outer circumferential surface of the piston ring and through the gap between the circumferential opposite ends of the piston ring. When the dimension of the gap increases the gas leakage through the gap increases as compared with the leakage through the remaining portion.

Various proposals have been made to decrease the gas leakage through the gap, e.g., the circumferentially opposite ends of the piston ring are formed to have stepped configurations which partially overlap with each other in the axial direction whereby the effective area of the gap causing the gas leakage can be reduced by about one half.

Another proposal includes a metal backing ring which is inserted between the inner circumferential surface of the piston ring and the bottom wall of the piston ring groove and is pressed against the inner circumferential surface of the piston ring, particularly at the location of the gap, by the resiliency of the backing ring. The backing ring is effective in reducing substantially the gas leakage through the gap. However, provision of the backing ring is not necessarily advantageous since the backing ring tends to excessively press the piston ring against the cylinder wall thereby increasing the wear of the piston ring and the cylinder, and the piston ring groove will sometimes be damaged by the backing ring. Further, a backing ring is a member separate from the piston ring, thus complicating the manufacturing and assembling process.

Japanese Patent Publication No. 54-42083 shows a resilient non-metallic seal ring or arcuate plate interposed between the inner surface of the piston ring and the bottom wall of the piston ring groove so as to reduce the pressing force applied on the piston ring. The damage to the piston ring groove can be prevented, but desired sealing characteristics cannot necessarily be obtained since the seal plate will sometimes separate from the piston ring.

Japanese Patent Disclosure (Kokai Koho) No. 55-27524 shows a piston ring having axially overlapping stepped ends. The stepped ends of the low pressure side of the piston ring are further formed to have radially overlapping stepped configurations, whereby the gap in the low pressure side is divided into two circumferential gaps and a circumferentially extending clearance, thus making it possible to reduce the leakage through the gap. However, the circumferentially extending clearance will increase due to the difference in the wear in the adjacent end portions of the piston ring and thus the sealing characteristics of the sealing ring will be impaired during use.

SUMMARY OF THE INVENTION

The present invention aims to improve the sealing characteristics of the piston ring and provides a piston ring working in a cylinder and receiving a higher pressure on one axial side thereof than on the other, the piston ring having axially overlapping stepped ends, the stepped ends of the high pressure side of the piston ring being defined by a generally axially and radially extending shoulder and a correspondingly shaped end surface, one of the stepped ends of low pressure side being formed to have a circumferentially extending resilient lip, and the other of the stepped ends of the low pressure side being formed to have a circumferentially extending projection which defines a recess corresponding to the lip and is located radially outwards of the lip. When the pressure acts on the radially inner surface of the piston ring the lip deforms to engage with the wall of the projection, and closes the clearance therebetween.

The piston ring according to the invention can effectively close the gap during the long period of usage.

It will be noted that the wording in the specification "axial, radial and circumferential" is referred with respect to the longitudinal axis of the piston or the cylinder.

BRIEF DESCRIPTION OF THE DRAWINGS

Further objects and advantages of the invention will become apparent from the following description taken in connection with the accompanying drawings, in which.

DETAILED DESCRIPTION OF THE PREFERRED EMBODIMENTS

Figure 1:
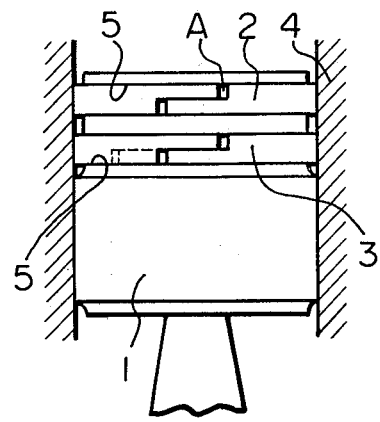
FIG. 1 is a schematic view showing a piston reciprocally working in a cylinder and having two prior art piston rings.

FIG. 1 shows a piston 1 in a cylinder 4, having two prior art piston rings 2 and 3 in annular grooves 5 of the piston.

Figure 2:
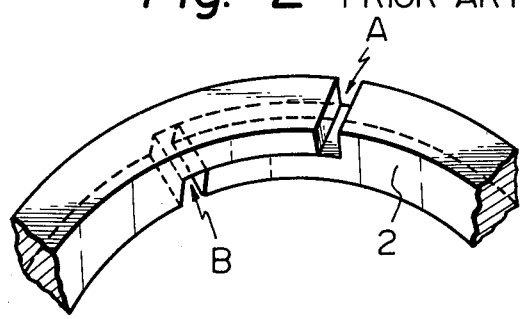
FIG. 2 is a partial perspective view of a prior art piston ring being used as the upper piston ring in FIG. 1.

FIG. 2 shows a typical prior art piston ring 2 having axially stepped circumferential ends which define therebetween a circumferential gap A on the high pressure side (the upper side as viewed in FIG. 1) and a circumferential gap B on the low pressure side.

Figure 3:
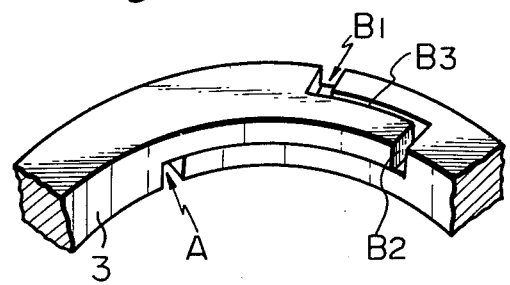
FIG. 3 is a partial perspective view of another prior art piston ring being used as the lower piston ring in FIG. 1 and being seen from the lower side.

FIG. 3 shows a piston ring 3 of the kind disclosed in the aforementioned Japanese Patent Disclosure No. 55-27524 in which the gap B on the low pressure side is divided into two radial gaps $B_1$ $B_2$ and a circumferentially extending clearance $B_3$ by means of radial steps.

Figure 4:
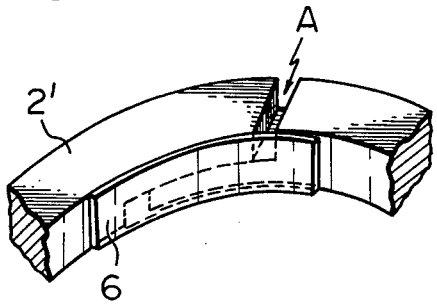
FIG. 4 is a partial perspective view of a still further prior art piston ring as modified from the piston ring of FIG. 2.
Figure 5:
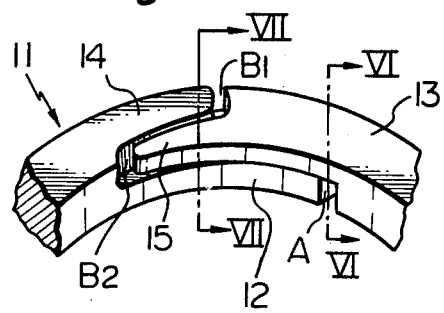
FIG. 5 is a partial perspective view of a piston ring according to the invention as viewed from the lower side thereof.
Figure 6:
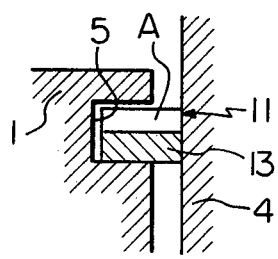
FIG. 6 is a vertically inverted partially sectional view of the piston ring of FIG. 5 fitted on a piston and working in a cylinder and being taken along line VI—VI in FIG. 5.
Figure 7:
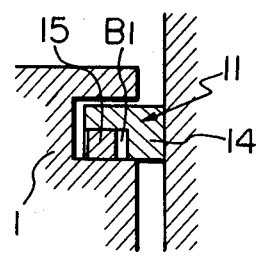
FIG. 7 is a vertically inverted view similar to FIG. 6 but taken along line VII—VII in FIG. 5.

FIG. 4 shows a piston ring 2' of the kind disclosed in Japanese Patent Publication No. 54-42083 wherein an arcuate or a ring shaped resilient plate 6 covers the gaps of the piston ring 2'

The piston ring 11 according to the invention and shown in FIGS. 5–9 is preferably formed of a non-metallic, resilient and heat resisting sealing material such as fluoride ethylene resin (e.g. PTFE) which is relatively soft and yieldable. The straight through gap A on the high pressure side extends generally in the radial direction and is defined by an axially and radially extending shoulder and a correspondingly shaped end surface similarly to the piston ring of FIG. 2. The gap on the low pressure side is, similarly to the piston ring of FIG. 3, divided into two radially extending gaps $B_1$ and $B_2$ and a generally circumferentially extending gap $B_3$. According to the invention, there is provided a resilient lip 15 on one circumferential end 13 of the ring 11 to extend generally in the circumferential direction and along the radially inner surface of the ring 11. In the other end 12 of the ring 11 there is provided a circumferentially extending projection 14 which defines a recess with the lip 15, as clearly shown in FIG. 7. The pressure acting on the upper side of the ring 11 as viewed in FIG. 7 prevails on the radially inner surface of the piston ring 11, thereby the lip 15 is pressed outwards against the radially inner surface of the projection 14 and closes the circumferential clearance through which the gaps $B_1$ and $B_2$ would communicate. Thus, the leakage through gaps $B_1$ and $B_2$ can be prevented.

Figure 8:
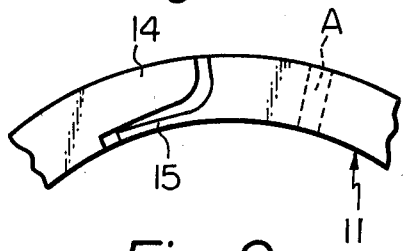
FIG. 8 is a partial bottom view of the piston ring of FIG. 5.
Figure 9:
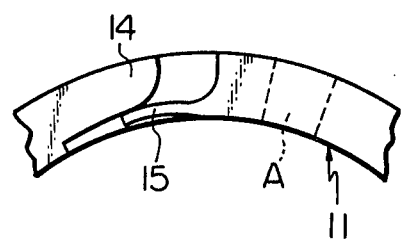
FIG. 9 is a view similar to FIG. 8 but showing a condition wherein the gap is increased.

As the piston ring 11 wears, the gap between the opposite ends of the piston ring 11 will progressively increase as shown in FIGS. 8 and 9. However, the lip 15 can effectively seal the gap.

Figure 10:
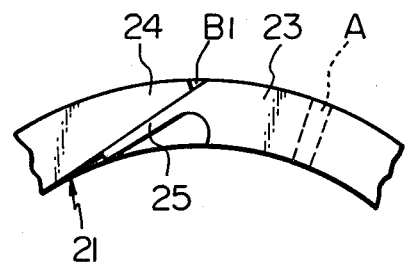
FIG. 10 is a view similar to FIG. 8 but showing a second embodiment of the invention.
Figure 11:
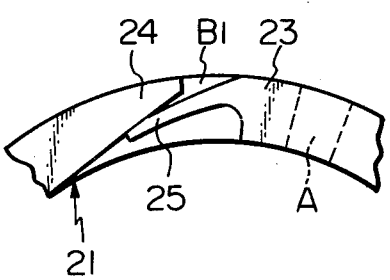
FIG. 11 is a view similar to FIG. 9 but showing the second embodiment of the invention.

FIGS. 10 and 11 show another embodiment of the invention wherein the radially inner surface of circumferentially extending projection 24 at one circumferential end is defined by an inclined line and lip 25 of the other circumferential end 23 extends circumferentially and radially inwards and generally along the radially inner surface of the projection 24. When the piston ring 21 is not worn, with the gap A being relatively small, the deformation of the lip 25 is relatively small (FIG. 10), but when the gap A increases due to the wear in the outer circumferential surface of the piston ring 21, the lip 25 is deformed by the pressure acting on the radially inner surface of the piston ring and is pressed tightly against the projection 24 (FIG. 11).

As is illustrated in FIGS. 8–11, the lip 15 or the lip 25 is thinner than the projection and therefore more easily flexed in sealing contact with the projection.

According to the invention, the lip provided on one circumferential end of the piston ring on the low pressure side resiliently deforms to reliably engage with the side surface of a projection on the other circumferential end due to the pressure acting on the radially inner surface of the piston ring. Thus the sealing characteristics will not be impaired even though the circumferential end portions of the piston ring may wear unevenly. Further, dimensional accuracy is not required since the lip deforms by a pressure to engage with the projection, and the number of parts is reduced. Thus, the manufacturing and assembling process is easy and is reliable in operation.

Although the invention has been described with respect to only two embodiments, the invention is not limited to the embodiments, and those skilled in the art may easily apply various variations and modifications within the gist of the invention. The lip and the projection according to the invention may be formed to have any desired configuration provided that the lip and the projection are provided on respective circumferential ends of the low pressure side of the axially stepped ends of the piston ring, that the lip and the projection are integral with the piston ring to extend in the circumferential direction in the region between the inner and the outer diameters of the piston ring, and that the lip at least partially overlaps with the projection in the radial direction and is located radially inwards of the projection.

What is claimed is:

1. A piston ring comprising :
an annular member of resilient material surrounding a longitudinal axis; said annular member having opposing high pressure and low pressure sides bounded radially by opposing radially inner and outer surfaces; a radial slit dividing said high pressure and low pressure sides along an arc generally perpendicular said axis; a radially and circumferentially extending gap through said low pressure side communicating with said slit at one end of said arc so as to form from said low pressure side within said arc a circumferentially extending resilient lip, and from said low pressure side adjacent said arc, a circumferentially extending projection; said circumferentially and radially extending gap separating said lip and said projection; said lip having a radially outer face; said projection having a radially inner face confronting said radially outer face; said lip being located substantially radially inwardly of said projection; said annular member further having a straight through gap radially extending from said radially inner surface to said radially outer surface through said high pressure side communicating with said slit at the other end of said arc, whereby at least a portion of said radially outer face of said lip is pressed against said radially inner face of said projection when pressure is applied to said radially inner surface, said at least a portion of said radially outer face being pressed against said radially inner face even when the width of said radially and circumferentially extending gap is substantially increased by wear of said ring.

2. A piston ring as in claim 1, wherein said lip is thinner than said projection and easily flexed in response to said pressure applied to said radially inner surface.

* * * * *